United States Patent
Nien et al.

(10) Patent No.: US 11,712,143 B2
(45) Date of Patent: Aug. 1, 2023

(54) CLEANING ROBOT AND RECHARGE PATH DETERMINING METHOD THEREFOR

(71) Applicant: PixArt Imaging Inc., Hsin-Chu County (TW)

(72) Inventors: Chu-Hung Nien, Hsin-Chu County (TW); Chao-Chien Huang, Hsin-Chu County (TW); Shu-Sian Yang, Hsin-Chu County (TW); Wei-Feng Wei, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 270 days.

(21) Appl. No.: 16/386,563

(22) Filed: Apr. 17, 2019

(65) Prior Publication Data

US 2020/0077859 A1    Mar. 12, 2020

(30) Foreign Application Priority Data

Sep. 11, 2018    (CN) .......................... 201811056712.X

(51) Int. Cl.
*A47L 11/40*    (2006.01)
*A47L 9/28*    (2006.01)
(Continued)

(52) U.S. Cl.
CPC .......... *A47L 11/4011* (2013.01); *A47L 9/2873* (2013.01); *B60L 53/36* (2019.02);
(Continued)

(58) Field of Classification Search
CPC ............... G05D 1/0234; G05D 1/0225; G05D 2201/0203; A47L 11/4011; A47L 9/2873;
(Continued)

(56) References Cited

U.S. PATENT DOCUMENTS 7,430,462 B2 * 9/2008 Chiu .................... H02J 7/0044
  700/245
10,131,237 B2 * 11/2018 Salter ...................... B60L 50/50
(Continued)

FOREIGN PATENT DOCUMENTS

CN    104716681 A    6/2015
CN    105242670 A    1/2016
(Continued)

OTHER PUBLICATIONS

Takahisa, "Charging device", Sep. 2009, JP2009201226A, English Translation (Year: 2011).*

(Continued)

*Primary Examiner* — Rachid Bendidi
*Assistant Examiner* — Selena M Jin
(74) *Attorney, Agent, or Firm* — Hauptman Ham, LLP

(57) ABSTRACT

There is provided a cleaning robot system including a charging station and a cleaning robot. The charging station includes multiple positioning beacons. The cleaning robot includes an image sensor and a processor. The image sensor is used to acquire light generated by the multiple positioning beacons on the charging station and generate an image frame. The processor is electrically connected to the image sensor, and used to calculate a relative position with respect to the charging station according to beacon images of the multiple positioning beacons in the image frame to determine a recharge path accordingly.

19 Claims, 5 Drawing Sheets

(51) Int. Cl.
*B60L 53/36* (2019.01)
*G05D 1/02* (2020.01)
*H02J 7/00* (2006.01)

(52) U.S. Cl.
CPC ......... *G05D 1/0225* (2013.01); *G05D 1/0234* (2013.01); *H02J 7/0042* (2013.01); *A47L 2201/022* (2013.01); *A47L 2201/04* (2013.01); *G05D 2201/0203* (2013.01)

(58) Field of Classification Search
CPC ........... A47L 2201/022; A47L 2201/04; B60L 53/36; H02J 7/0042
See application file for complete search history.

(56) References Cited

U.S. PATENT DOCUMENTS

| | | | | |
|---|---|---|---|---|
| 2005/0213082 | A1* | 9/2005 | DiBernardo | G01S 17/06 356/139.03 |
| 2007/0050086 | A1* | 3/2007 | Lim | G05D 1/0242 700/245 |
| 2009/0228165 | A1* | 9/2009 | Ozick | G05D 1/0225 320/137 |
| 2012/0086389 | A1* | 4/2012 | Li | A47L 9/2852 320/107 |
| 2014/0100693 | A1* | 4/2014 | Fong | A47L 9/2873 700/253 |
| 2015/0115876 | A1* | 4/2015 | Noh | A47L 9/2873 320/107 |
| 2016/0091899 | A1* | 3/2016 | Aldred | B60L 1/003 701/23 |
| 2016/0309974 | A1* | 10/2016 | Abe | G05D 1/0234 |
| 2016/0327954 | A1* | 11/2016 | Hoshino | A47L 11/4011 |
| 2016/0370804 | A1* | 12/2016 | Suh | B60L 53/305 |
| 2018/0188737 | A1* | 7/2018 | Won | B60L 53/37 |
| 2018/0249872 | A1 | 9/2018 | Park | |
| 2019/0146517 | A1* | 5/2019 | Ryu | G06T 7/74 701/28 |
| 2021/0165421 | A1* | 6/2021 | Ko | G05D 1/027 |

FOREIGN PATENT DOCUMENTS

| | | | | |
|---|---|---|---|---|
| CN | 106444777 A | | 2/2017 | |
| CN | 108634872 A | * | 10/2018 | ............ A47L 11/24 |
| JP | 2009201226 A | * | 9/2009 | ............... H02J 7/00 |
| KR | 20100010962 A | * | 2/2010 | |

OTHER PUBLICATIONS

English Translation of KR20100010962A (Year: 2010).*
Bian, Z. "Translation of CN-108634872-A", Oct. 2018 (Year: 2018).*

* cited by examiner

CLEANING ROBOT AND RECHARGE PATH DETERMINING METHOD THEREFOR

RELATED APPLICATIONS

The present application claims priority to China Application Number 201811056712.X, filed Sep. 11, 2018, the disclosure of which is hereby incorporated by reference herein in its entirety.

BACKGROUND

1. Field of the Disclosure

This disclosure generally relates to a cleaning robot and, more particularly, to a cleaning robot and an operating method thereof that identify a current position thereof according to a configuration of beacon images in an image frame acquired by an image sensor and accordingly calculate a recharge path.

2. Description of the Related Art

As the cleaning robot operates in an independent closed system, it is required that a cleaning robot has to return to a charging station for recharging. To realize the function of automatic recharging when a low battery power is detected, most of the cleaning robots return to a neighborhood of the charging station at first, and then perform a fine position correction.

More specifically, a commercial product generally uses a configuration of a signal transmitting station operating in conjunction with a light emitting diode or a signal transmitting station operating in conjunction with an infrared receiver. Different directions and distances are identified according to the energy intensity of detected wireless signals. However, this type of configuration has a problem of low accuracy. Another problem of the identification method using the energy intensity of wireless signals is that a direction of the charging station is not identifiable such that the cleaning robot may not be able to return to the charging station correctly.

Accordingly, one objective of the present disclosure is to solve the problem of more accurately returning a cleaning robot to a charging station. The problem of unable to recharge due to not able to return to a charging station correctly and due to the collision with the charging station caused by the direction error in returning to the charging station is avoided.

SUMMARY

The present disclosure provides a cleaning robot and a recharge path determining method that calculate a relative distance and angle of the cleaning robot with respect to a charging station according to relative positions of multiple beacon images in an acquired image frame to calculate a correct recharge path.

The present disclosure further provides a cleaning robot system that changes a direction of a charging station to allow a cleaning robot to return to the charging station correctly.

The present disclosure provides a cleaning robot system including a charging station and a cleaning robot. The charging station includes multiple positioning beacons. The cleaning robot includes an image sensor, a motor and a processor. The image sensor is configured to capture light generated by the multiple positioning beacons on the charging station and generate an image frame. The processor is electrically connected to the image sensor and the motor, and configured to calculate a relative position with respect to the charging station according to beacon images of the multiple positioning beacons in the image frame, and drive the motor according to the relative position to control the cleaning robot to return to the charging station for recharging.

The present disclosure further provides a cleaning robot including an image sensor, a motor and a processor. The image sensor is configured to capture light generated by multiple positioning beacons having a predetermined characteristic and generate an image frame. The processor is electrically connected to the image sensor and the motor, and configured to calculate a relative position with respect to the multiple positioning beacons according to beacon images of the multiple positioning beacons in the image frame, and drive the motor according to the relative position to control the cleaning robot to move to a predetermined position with respect to the multiple positioning beacons.

The present disclosure further provides a recharge path determining method for a cleaning robot. The cleaning robot includes a charging station that has multiple positioning beacons and a cleaning robot that has an image sensor and a processor. The method includes the steps of: capturing, by the image sensor, light generated by the multiple positioning beacons on the charging station and generating an image frame; calculating, by the processor, a relative position with respect to the charging station according to beacon images of the multiple positioning beacons in the image frame; and controlling, by the processor, the cleaning robot according to the relative position to return to the charging station for recharging.

In the embodiments of the present disclosure, the beacon characteristic includes the light pattern, color, emission frequency, size and so on.

In the embodiments of the present disclosure, a number of positioning beacons is at least 3 to correctly calculate a relative distance and a relative angle according to a single image frame.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The function of every embodiment of the present disclosure is to use an image sensor to watch a charging station, and use an algorithm to calculate a correct distance and angle based on a predetermined configuration and quantity of multiple positioning beacons on the charging station. In this way, a cleaning robot may accurately return to the charging station corresponding to a direction of the charging station. Furthermore, the direction of the charging station is automatically changeable corresponding to a moving direction of the cleaning robot to avoid error in angle while entering the charging station.

In brief, each embodiment of the present disclosure uses an image sensor to capture a charging station, and a relative distance and angle of a cleaning robot adopting the image sensor with respect to the charging station is calculated according to the captured image information. In this way, the cleaning robot can correctly return to the charging station for recharging. Some embodiments of the present disclosure are illustrated hereinafter by examples.

Figure 1:
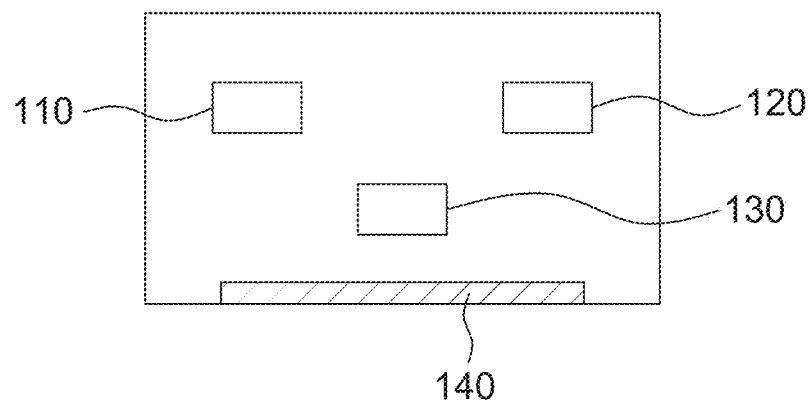
FIG. 1 is a front view of a charging station of a cleaning robot system according to one embodiment of the present disclosure.
Figure 2:
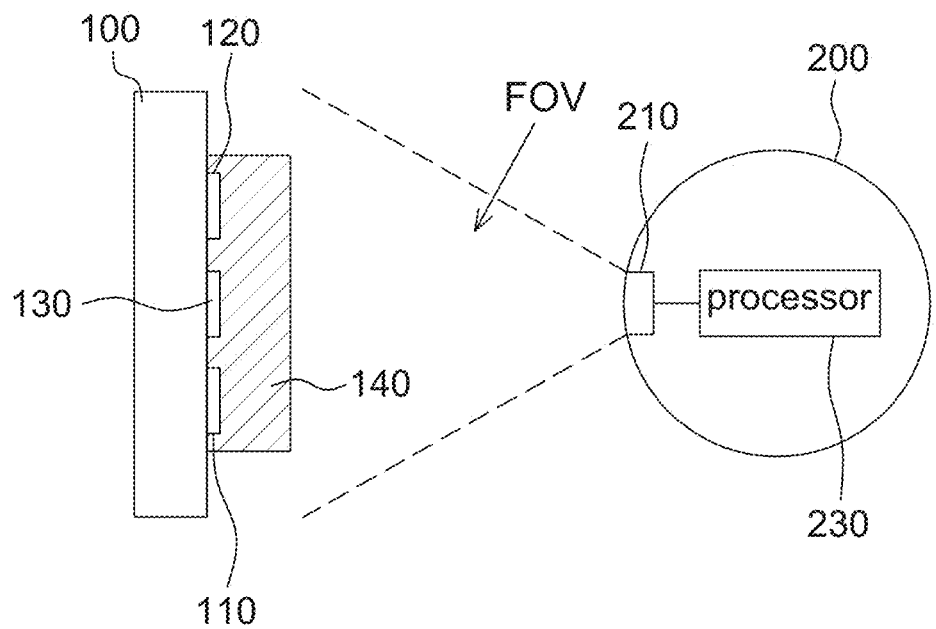
FIG. 2 is a top view of a cleaning robot system according to one embodiment of the present disclosure.

FIG. 1 is a front view of a charging station 100 according to one embodiment of the present disclosure; and FIG. 2 is a top view of a cleaning robot system 1000 according to one embodiment of the present disclosure. Please refer to FIGS. 1 and 2 together, the cleaning robot system 1000 of the present disclosure includes at least one charging station 100 and a cleaning robot 200, wherein the charging station 100 includes multiple positioning beacons for emitting identifiable light spectrum, e.g., FIGS. 1 and 2 showing a first infrared light source 110, a second infrared light source 120 and a third infrared light source 130 as the positioning beacons. As long as the charging station 100 is located within a field of view FOV of the image sensor 210 of the cleaning robot 200, the cleaning robot 200 may correctly return to the charging station 100 for recharging according to the method of the present disclosure.

In some embodiments, the cleaning robot system 1000 includes multiple charging stations 100, and the cleaning robot 200 returns to a charging station 100 that is located in the field of view FOV of the image sensor 210 thereof.

In this embodiment, the first infrared light source 110, the second infrared light source 120 and the third infrared light source 130 are arranged at a same surface of the charging station 100 (e.g., a surface facing a working space of the cleaning robot 200), wherein the arranged heights of the first infrared light source 110 and the second infrared light source 120 are higher than that of the third infrared light source 130, and the spatial relationship between the first infrared light source 110, the second infrared light source 120 and the third infrared light source 130 form an isosceles triangle. For example, the third infrared light source 130 is arranged at the perpendicular bisector of the charging station 100 as shown in FIG. 1, but the present disclosure is not limited thereto. It should be mentioned that the quantity and arranged height of the multiple positioning beacons of the present disclosure are only intended to illustrate but not to limit the present disclosure. Based on the concept of the present disclosure, it is possible to arrange more than 3, e.g., 4 or 5 positioning beacons having identical or different characteristics.

In addition, the arranged height of the multiple positioning beacons includes more than two height differences according to different applications. The multiple positioning beacons may be arranged to have identical characteristics to be distinguished from ambient light, or to have different characteristics to be distinguished from one another.

In addition, the charging station 100 further includes a charging electrode base 140 as shown in FIGS. 1 and 2, wherein when approaching or in contact with the charging electrode base 140, the charging robot 200 is recharged. It is appreciated that the arranged position, the shape and the size of the charging electrode base 140 are arranged corresponding to the charging electrode of cleaning robot 200. In one non-limiting embodiment, the charging electrode base 140 has at least one charging electrode as a passive light source. The charging electrode is used to reflect light generated by an illumination light source of the cleaning robot 200 to be used as at least one of the multiple positioning beacons.

Figure 3:
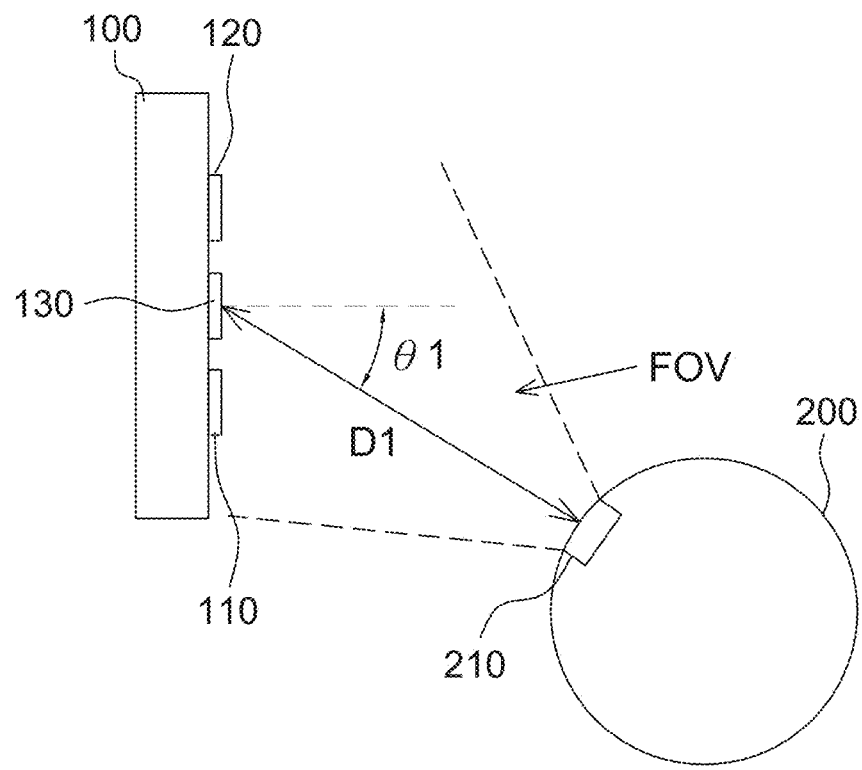
FIG. 3 is a schematic diagram of a cleaning robot located at a first relative position according to one embodiment of the present disclosure.

The cleaning robot 200 of the present disclosure is arranged with an image sensor 210. The image sensor 210 captures images in front (e.g., a moving direction) of the cleaning robot 200. Accordingly, when the charging station 100 is within a field of view FOV of the image sensor 210, the image sensor 210 captures light generated by the multiple positioning beacons on the charging station 100 and generates an image frame. For example, FIGS. 4 and 6 respectively show beacon images of the infrared light sources 110, 120 and 130, wherein FIGS. 4 and 6 respectively show image frames IF1 and IF2 captured by the image sensor 210 from "different angles" when the cleaning robot 200 is at "different relative positions" as shown in FIGS. 3 and 5.

The cleaning robot 200 further includes a processor 230 electrically connected to the image sensor 210 to calculate a relative position with respect to the charging station 100 according to beacon images (e.g., $I_{130}$ to $I_{130}$ in FIGS. 4 and 6) of the multiple positioning beacons in the image frame. The processor 230 drives a motor (also electrically connected to the processor 230) of the cleaning robot 200 according to the calculated relative position to control the cleaning robot 200 to return to the charging station 100 for recharging. More specifically speaking, a charging position of the charging station 100 is at a predetermined position with respect to the multiple positioning beacons. When the cleaning robot 200 moves to the predetermined position, the electrode on the cleaning robot 200 contacts the charging electrode of the charging station 100 to start recharging.

The predetermined position includes a distance and an angle. The processor 230 firstly controls the cleaning robot 200 to move to a predetermined distance from the multiple positioning beacons, and then controls the cleaning robot 200 to continuously move, maintaining the predetermined distance, to a predetermined angle. Or, the processor 230 firstly controls the cleaning robot 200 to move to the predetermined angle with respect to the multiple positioning beacons, and then controls the cleaning robot 200 to continuously move, maintaining the predetermined angle, to the predetermined distance.

One method for calculating the relative position is the perspectively-3-point (P3P) algorithm, which is a normal method of solving the perspective-n-point (PnP) problem. The algorithm is to project 3 points (e.g., corresponding to 3 positioning beacons of the present disclosure) having known relative distance in the 3D space to a 2D plane, and then respectively generate a transfer matrix between each other. By calculating the relationship between the 3 projected points having different distances therebetween in the 2D plane, it is able to derive a distance and angle in the 3D space at which these 3 points are watched. That is, the relative distance and relative angle are obtainable using the P3P algorithm.

For example in FIG. 2, it is assumed that the first positioning beacon 110 has a position A, the second positioning beacon 120 has a position B, the third positioning beacon 130 has a position C, and the image sensor 210 has a projection center P. Meanwhile, it is also assumed that X=|PA|, Y=|PB|, Z=|PC|, $\alpha=\angle BPC$, $\beta=\angle APC$, $\gamma=\angle APB$, p=2 cos $\alpha$, q=2 cos $\beta$, r=2 cos $\gamma$, a'=|AB|, b'=|BC| and c'=|AC|. Then, the P3P equation system is obtained as:

$$Y^2+Z^2-YZp-b'^2=0$$

$$Z^2+X^2-XZq-c'^2=0$$

$$X^2+Y^2-XYr-a'^2=0$$

The processor 230 calculates an optimum solution of the simultaneous equations.

Figure 4:
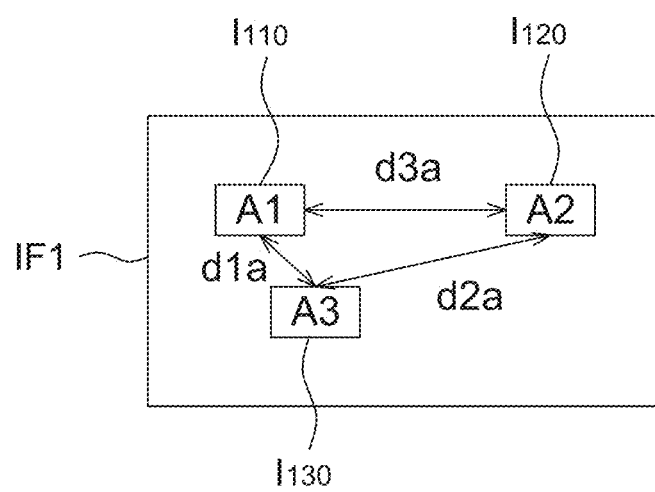
FIG. 4 is an image frame captured by the cleaning robot shown in FIG. 3.
Figure 5:
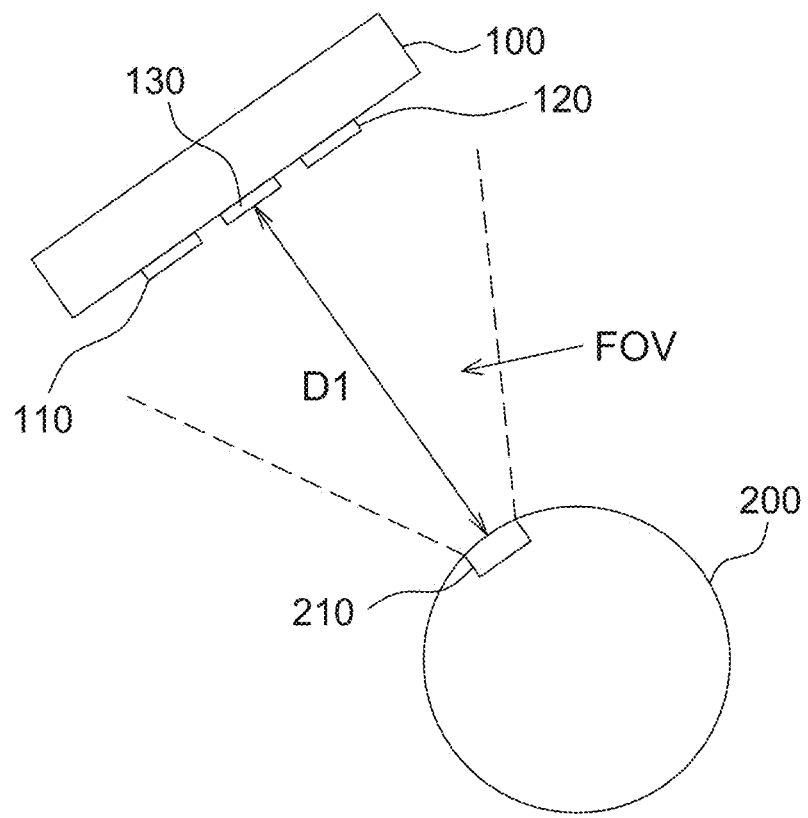
FIG. 5 is another schematic diagram of a cleaning robot located at the first relative position according to one embodiment of the present disclosure.

More specifically speaking, when the cleaning robot 200 is not right in front of the charging station 100, as shown in FIG. 4, the image sensor 210 captures images of the infrared light sources 110, 120 and 130 on the charging station 100 as the charging station 100 falls into a field of view FOV of the image sensor 210 to respectively generate beacon images I110 to I130 in the image frame IF1. It should be mentioned that the image sensor 210 of the present disclosure is an infrared light sensor so as to suitable for detecting images of the infrared light sources 110, 120 and 130. In another non-limiting embodiment, the cleaning robot 200 further has an infrared light source as an illumination light source. The infrared light source emits light toward the multiple positioning beacons, e.g., an emission angle of the infrared light source being substantially overlapped with at least a part of the field of view FOV of the image sensor 210. In this case, the charging station 100 is arranged with three reflective bars to replace the first infrared light source 110, the second infrared light source 120 and the third infrared light source 130. In this way, similar image information is obtainable. In other words, the multiple positioning beacons of the present disclosure are selected from active light sources that directly emit light or passive light sources that reflect light emitted by the illumination light source of the cleaning robot 200.

Referring to FIGS. 3 and 4 continuously, since the image sensor 210 acquires an image frame IF1 as shown in FIG. 4, it is able to calculate a distance D and an angle $\theta 1$ of the cleaning robot 200 with respect to the charging station 100 according to sizes A1, A2, A3 and relative distances d1a, d2a, d3a of the captured beacon images $I_{110}$, $I_{120}$, $I_{130}$ of the infrared light sources 110, 120 and 130. Compared to the conventional method that uses the intensity of wireless signals to identify a distance, the present disclosure can obtain more accurate position information.

Figure 6:
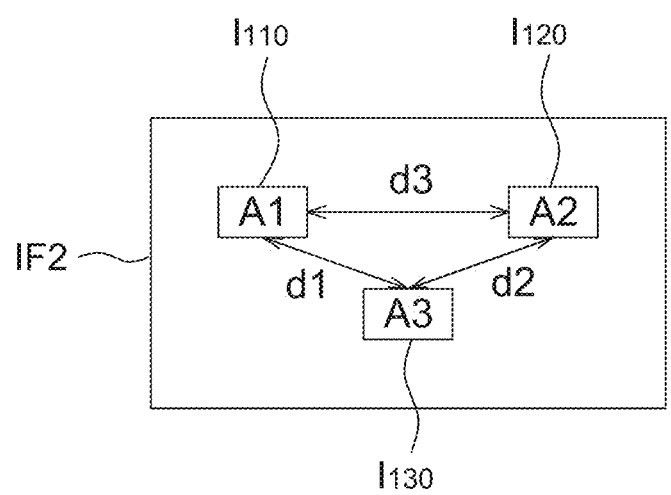
FIG. 6 is an image frame captured by the cleaning robot shown in FIG. 5.

When the cleaning robot 200 moves to the position shown in FIG. 5 at which the charging station 100 is right in front of the image sensor 210, the image frame IF2 associated with the infrared light sources 110, 120 and 130 are obtained as shown in FIG. 6, which also includes beacon images $I_{110}$, $I_{120}$ and $I_{130}$. Since the relative angle between the cleaning robot 200 and the charging station 100 is changed, the relative distances d1, d2, d3 of the beacon images $I_{110}$, $I_{120}$ and $I_{130}$ of the infrared light sources 110, 120 and 130 in FIG. 6 are different from the distances d1a, d2a, d3a in FIG. 4. Similarly, by obtaining the image information of the infrared light sources 110, 120 and 130 as in FIG. 6, it is also able to calculate a current distance D1 and angle (e.g., angle=0 degree corresponding to d1=d2 or d1=d2=d3) of the cleaning robot 200 with respect to the charging station 100.

It should be mentioned that, for illustration purposes, embodiments in FIGS. 3 and 5 are different by only changing an angle of the cleaning robot 200 with respect to the charging station 100 (e.g., implemented by moving the cleaning robot 200 in transverse direction or rotating the charging station 100), and the distance D1 of the cleaning robot 200 with respect to the charging station 100 is not adjusted. Accordingly, compared with FIG. 4, in FIG. 6 only the relative distances and positions of the beacon images $I_{110}$, $I_{120}$ and $I_{130}$ of the infrared light sources 110, 120 and 130 are changed, but the sizes A1, A2 and A3 of the beacon images $I_{110}$, $I_{120}$ and $I_{130}$ of the infrared light sources 110, 120 and 130 are not changed. In actual operation, the sizes A1, A2 and A3 of the beacon images $I_{110}$, $I_{120}$ and $I_{130}$ of the infrared light sources 110, 120 and 130 between FIGS. 4 and 6 still have a slight difference. More specifically, when a relative distance D1 between the charging station 100 and the cleaning robot 200 is farther, the sizes A1, A2 and A3 of the beacon images $I_{110}$, $I_{120}$ and $I_{130}$ of the infrared light sources 110, 120 and 130 between FIGS. 4 and 6 only have a tiny difference, and details of this physical mechanism are not illustrated herein.

In addition to using the above P3P algorithm to calculate the relative position between the charging station 100 and the cleaning robot 200, other methods can be used. In another aspect, a look up table regarding the relationship between a ratio of image distances between the beacon images $I_{110}$, $I_{120}$ and $I_{130}$ (e.g., d1a, d2a, d3a in FIG. 4) and relative angles $\theta 1$ is previously stored in the memory. In this way, when the processor 230 calculates the image distances, it is able to obtain a relative angle $\theta 1$ according to the look up table accordingly.

Figure 7:
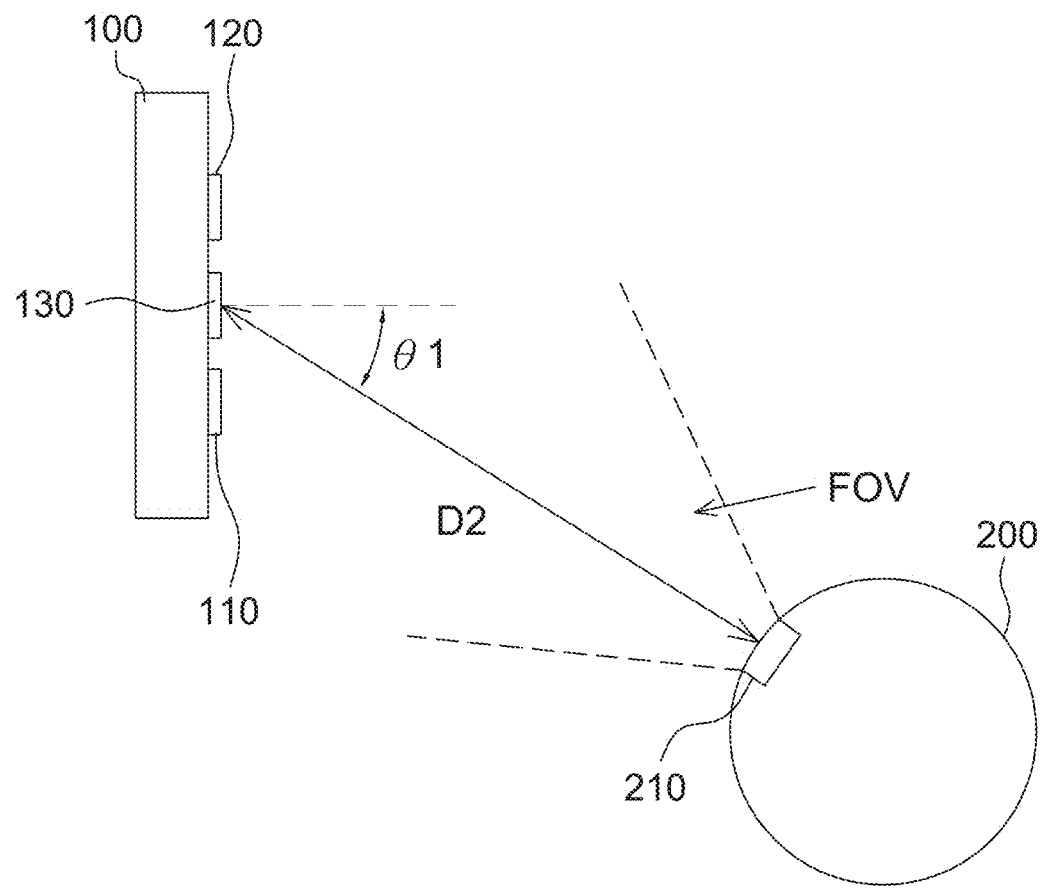
FIG. 7 is a schematic diagram of a cleaning robot located at a second relative position according to one embodiment of the present disclosure.
Figure 8:
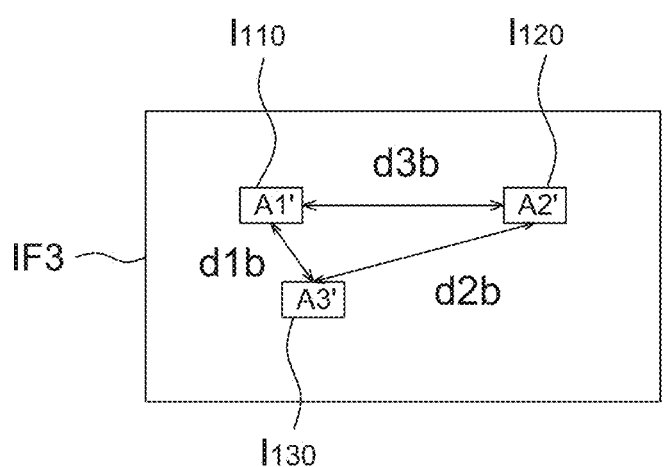
FIG. 8 is an image frame captured by the cleaning robot shown in FIG. 7.

In addition, referring to FIGS. 3 and 7 that show different relative distances (e.g., D1≠D2) between the charging station 100 and the cleaning robot 200, and the image sensor 210 respectively captures the image frames IF1 and IF3 associated with the infrared light sources 110, 120 and 130 as shown in FIGS. 4 and 8. It is seen from IF1 and IF3 that at the same angle $\theta 1$, compared with the sizes A1, A2, A3 of the beacon images $I_{110}$, $I_{120}$ and $I_{130}$ of the infrared light sources 110, 120 and 130 in FIG. 4, the sizes A1', A2', A3' of the beacon images $I_{110}$, $I_{120}$ and $I_{130}$ of the infrared light sources 110, 120 and 130 in FIG. 8 are smaller since the relative distance between the charging station 100 and the cleaning robot 200 is farther (e.g., D2 is larger). In other words, by processing the image in this way, it is able to obtain the current distance D1 or D2.

More specifically, in addition to calculating the relative position between the charging station 100 and the cleaning robot 200 using the P3P algorithm, it is able to calculate the relative distance D1 and D2 using other methods such as according to the sizes and distances of the beacon images $I_{110}$, $I_{120}$ and $I_{130}$ or according to an area of a triangle formed by the beacon images $I_{110}$, $I_{120}$ and $I_{130}$.

Figure 9:
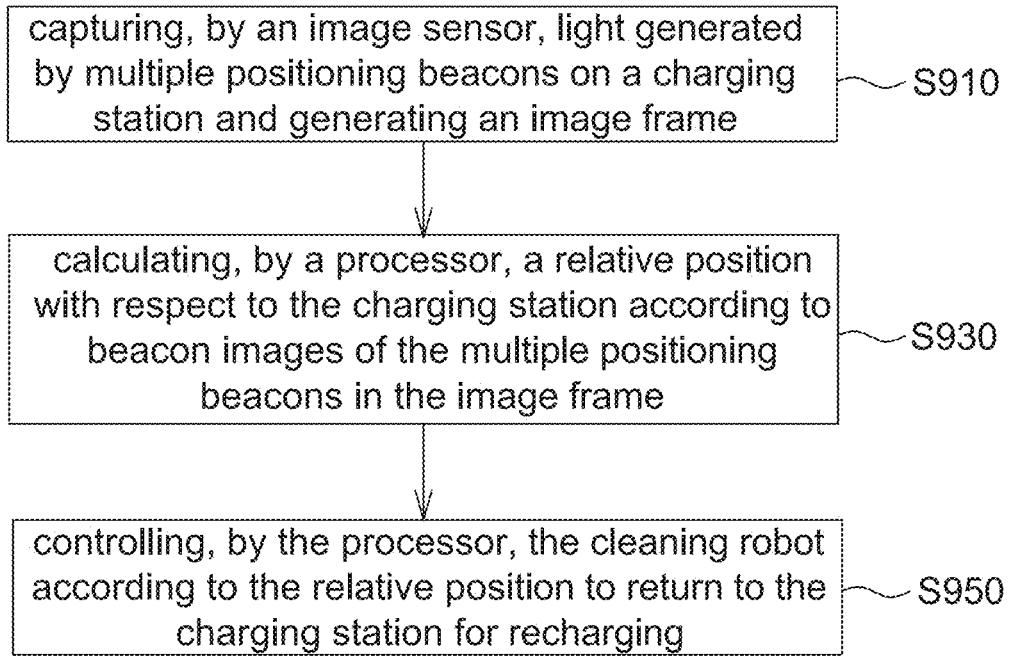
FIG. 9 is a flow chart of a recharge path determining method of a cleaning robot system according to one embodiment of the present disclosure.

The method of implementing the recharging of the cleaning robot 200 is illustrated in the flow chart of FIG. 9. When the image sensor 210 on the cleaning robot 200 detects positions of different positioning beacons, this information is sent to the processor (e.g., central processing unit, microcontroller unit or application specific integrated circuit) to be processed. Then, the processor 230 uses the embedded algorithm (as mentioned above) to calculate the relative distance and angle between the charging station 100 and cleaning robot 200 using position information of the positioning beacons. The processor 230 also calculates a suitable control signal according to the calculated relative distance and angle, and uses this control signal to control a motor for driving wheels thereby achieving the purpose of returning the robot for recharging.

For example, the recharge path determining method for a cleaning robot system in FIG. 9 includes the steps of: capturing, by an image sensor, light generated by multiple positioning beacons on a charging station and generating an image frame (Step S910); calculating, by a processor, a relative position with respect to the charging station according to beacon images of the multiple positioning beacons in the image frame (Step S930); and controlling, by the processor, the cleaning robot according to the relative position to return to the charging station for recharging (Step S950), wherein details of the determining method has been illustrated above and thus details thereof are not repeated again.

As mentioned above, the processor 230 calculates the relative position between the charging station 100 and the cleaning robot 200 according to the PnP algorithm (e.g., P referred to a number of beacons), look up table, seizes of beacon images or distances between beacon images, and controls the cleaning robot 200 to return to the charging station 100 for recharging according to the calculated relative position. In one non-limiting embodiment, the processor 230 firstly controls the cleaning robot 200 to move (using the motor to roll wheels) to a predetermined distance relative to the multiple positioning beacons, and then controls the cleaning robot 200 to continuously move, at the predetermined distance, to a predetermined angle, or vice versa, or to change the relative distance and relative angle together till the cleaning robot 200 successively returns to the charging station 100.

As mentioned above, the multiple positioning beacons are active or passive light sources. When the multiple positioning beacons are passive light sources, the cleaning robot 200 further includes an illumination light source used to emit light for illuminating the passive light sources. The processor 230 controls the illumination light source to emit light corresponding to the image capturing of the image sensor 210.

As mentioned above, the multiple positioning beacons have different characteristics. The processor 230 distinguishes different beacons according to the different characteristics so as to identify whether the cleaning robot 200 is at a left or right side of the charging station 100 in calculating the relative position.

As mentioned above, the charging station 100 is rotatable such that when identifying that the cleaning robot 200 is not at right front of the charging station 100, the processor 230 sends a control signal Sc to the charging station 100 to rotate the charging station 100 to directly face the cleaning robot 200. In this case, the processor 230 only needs to control the cleaning robot 200 to move forward the charging station 100, and the relative angle is adjusted by changing a facing direction of the charging station 100.

In addition, when the processor 230 identifies that the image frame captured by the image sensor 210 does not contain any beacon image, the processor 230 further controls the field of view of the image sensor 210, e.g., rotating the cleaning robot 200 or rotating a platform on which the image sensor 210 is arranged, to search a direction of the charging station 100.

Figure 10:
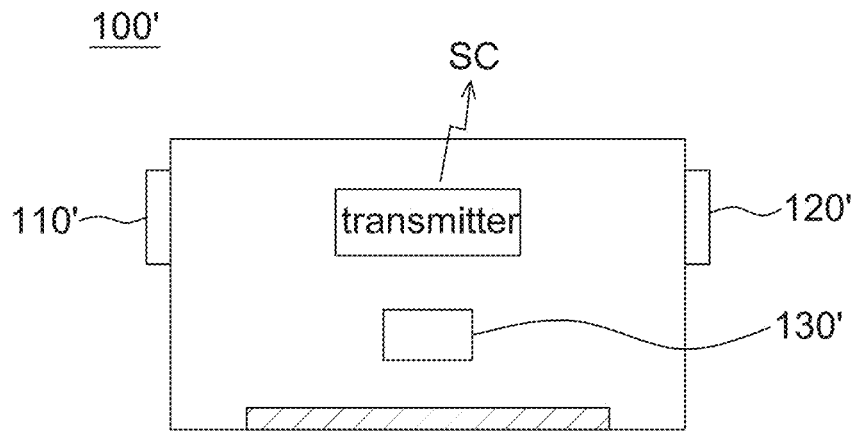
FIG. 10 is a front view of a charging station of a cleaning robot system according to another embodiment of the present disclosure.

Please refer to FIG. 10, it is a front view of a charging station 100' according to another embodiment of the present disclosure. The charging station 100' of this embodiment also includes multiple positioning beacons, e.g., 110', 120' and 130'. A first positioning beacon 110' is located at a first surface of the charging station 100', e.g., left surface. A second positioning beacon 120' is located at a second surface of the charging station 100', e.g., right surface. A third positioning beacon 130' is located at a third surface of the charging station 100', e.g., front surface. In this embodiment, the first positioning beacon 110' and the second positioning beacon 120' preferably have different characteristics, e.g., different patterns, colors, emission frequencies, sizes and so on, for being distinguished by the processor 230.

The multiple positioning beacons in the above mentioned embodiments are arranged at the same surface, but the first positioning beacon 110' and the second positioning beacon 120' in this embodiment are arranged at two different surfaces opposite to each other. In this way, when the cleaning robot 200 is at a left side of the charging station 100' and the relative angle exceeds a specific angle, the image sensor 210 is not able to capture an image of the second positioning beacon 120', and since the processor 230 is previously arranged to know the individual characteristics of the first positioning beacon 110' and the second positioning beacon 120', the cleaning robot 200 changes its own position or sends a control signal Sc to the charging station 100' to change a direction thereof. Similarly, when the cleaning robot 200 is at a right side of the charging station 100' and the relative angle exceeds a specific angle, the image sensor 210 is not able to capture an image of the second positioning beacon 110'.

In this embodiment, the processor 230 further identifies whether a number of the beacon images (e.g., $I_{110}$, $I_{120}$ and $I_{130}$ in FIGS. 4, 6 and 8) is smaller than a predetermined number (e.g., 3 in this embodiment). When the number of beacon images is smaller than the predetermined number, the relative angle of the cleaning robot 200 with respect to the charging station 100 is changed, e.g., by changing a position of the cleaning robot 200 and/or rotating the charging station 100, to allow the image sensor 210 to be able to acquire all beacon images.

In one non-limiting embodiment, the cleaning robot 200 includes a first motor for controlling the cleaning robot 200 to move forward and includes a second motor for controlling the cleaning robot 200 to rotate. When identifying that the cleaning robot 200 is at one side of the charging station 100', the processor 230 firstly controls the cleaning robot 200 to move toward an opposite side of the charging station 100' to allow the image sensor 210 to be able to acquire beacon images of all the first positioning beacon 110', the second positioning beacon 120' and the third positioning beacon 130'. Then, the processor 230 calculates the relative position of the cleaning robot 200 with respect to the charging station 100' according to the above mentioned method. Or, the cleaning robot 200 includes a transmitter for sending a control signal Sc to the charging station 100' to change an emission direction of the multiple positioning beacons (i.e. rotating the charging station 100') to allow the image sensor 210 to be able to acquire beacon images of all the first positioning beacon 110', the second positioning beacon 120' and the third positioning beacon 130'. Then, the processor 230 calculates the relative position of the cleaning robot 200 with respect to the charging station 100' according to the above mentioned method.

In addition, when identifying that the image frame captured by the image sensor 210 does not contain any beacon image, the processor 230 controls the second motor to cause the cleaning robot 200 to perform an in situ rotation at its current position or controls a platform on which the image sensor 210 is carried to rotate so as to acquire light emitted by the multiple positioning beacons.

It should be mentioned that although the multiple positioning beacons in the above embodiments are shown as a rectangle as an example, the present disclosure is not limited thereto. In other embodiments, the multiple positioning beacons are selected from other shapes, e.g., circular shape, diamond shape and so on, as long as that shape is identifiable by the processor 230.

As mentioned above, the conventional cleaning robot can only determine the distance according to the energy intensity of wireless signals, and has the problem of unable to correctly return to the charging station. Accordingly, the present disclosure provides a cleaning robot system (e.g., FIGS. 2-8 and 10) and a recharge path determining method thereof (e.g., FIG. 9) that identify a relative position of a cleaning robot with respect to a charging station according to images captured by an image sensor to accordingly determine a recharge path. For example, the relative distance is controlled to reach a predetermined distance at first and then a relative angle is controlled to reach a predetermined angle, or vice versa, to cause the cleaning robot to return to the recharge station correctly.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A cleaning robot system, comprising:
    a charging station comprising multiple positioning beacons, the multiple positioning beacons including a first positioning beacon arranged at a first surface of the charging station and a second positioning beacon arranged at a second surface, opposite to the first surface, of the charging station; and
    a cleaning robot, comprising:
        an image sensor configured to capture light generated by the multiple positioning beacons on the charging station and generate an image frame;
        a motor; and
        a processor electrically connected to the image sensor and the motor, and configured to
            calculate a relative position of the cleaning robot with respect to the charging station according to beacon images of the multiple positioning beacons in the image frame, and
            drive the motor according to the relative position to control the cleaning robot to return to the charging station for recharging,
    wherein when a relative angle between the cleaning robot with respect to a front surface, which connects the first and second surfaces, of the charging station exceeds a predetermined angle, the image sensor of the cleaning robot does not capture the light generated by one of the first positioning beacon and the second positioning beacon, and
    upon the image sensor not capturing the light generated by one of the first positioning beacon and the second positioning beacon, the processor sends a control signal to rotate the charging station till the light generated by all the multiple positioning beacons arranged at different surfaces are captured by the image sensor and then the processor calculates the relative position, and
    the first positioning beacon is protruded out from the first surface and the second positioning beacon is protruded out from the second surface to cause the light from both the first positioning beacon and the second positioning beacon to be acquired by the cleaning robot to form beacon images when the cleaning robot is in front of the front surface of the charging station.

2. The cleaning robot system as claimed in claim 1, wherein the multiple positioning beacons are multiple active light sources or multiple passive light sources.

3. The cleaning robot system as claimed in claim 2, wherein
    the cleaning robot further comprises an illumination light source, and
    the charging station further comprises a charging electrode configured to reflect light generated by the illumination light source as one of the multiple passive light sources.

4. The cleaning robot system as claimed in claim 1, wherein the multiple positioning beacons have identical or different characteristics.

5. The cleaning robot system as claimed in claim 1, wherein the multiple positioning beacons are arranged at at least two different heights.

6. The cleaning robot system as claimed in claim 1, wherein the charging station is rotatable.

7. The cleaning robot system as claimed in claim 1, wherein
    the multiple positioning beacons further include a third position beacon located at the front surface, and
    when the cleaning robot is in front of the front surface of the charging station, beacon images of the first positioning beacon, the second positioning beacon and the third position beacon form a triangle shape in the image frame.

8. The cleaning robot system as claimed in claim 7, wherein the processor is further configured to
    determine the relative angle according to distances between the beacon images of the first positioning beacon, the second positioning beacon and the third position beacon from a predetermined look up table.

9. A cleaning robot, comprising:
    an image sensor configured to
        capture light generated by multiple positioning beacons having a predetermined characteristic, the multiple positioning beacons including a first positioning beacon arranged at a first surface of a charging station and a second positioning beacon arranged at a second surface, opposite to the first surface, of the charging station, and
        generate an image frame;
    a motor; and
    a processor electrically connected to the image sensor and the motor, and configured to
        calculate a relative position of the cleaning robot with respect to the multiple positioning beacons according to beacon images of the multiple positioning beacons in the image frame, and
        drive the motor according to the relative position to control the cleaning robot to move to a predetermined position with respect to the multiple positioning beacons,
    wherein when a relative angle between the cleaning robot with respect to a surface connecting the first and second surfaces exceeds a predetermined angle, the image sensor of the cleaning robot does not capture the light generated by one of the first positioning beacon and the second positioning beacon, and upon the image sensor not capturing the light generated by one of the first positioning beacon and the second positioning beacon, the processor sends a control signal to change an emission direction of the multiple positioning beacons till the light generated by all the multiple positioning beacons arranged at different surfaces are captured by the image sensor and then the processor calculates the relative position, and the first positioning beacon is protruded out from the first surface and the second positioning beacon is protruded out from the second surface to cause the light from both the first positioning beacon and the second positioning beacon to be acquired by the cleaning robot to form beacon images when the cleaning robot is in front of the charging station.

10. The cleaning robot as claimed in claim 9, wherein the motor comprises:
a first motor configured to control the cleaning robot to move forward; and
a second motor configured to control the cleaning robot to rotate.

11. The cleaning robot as claimed in claim 10, wherein the processor is further configured to control the second motor to cause the cleaning robot to perform an in situ rotation when the image frame does not contain any beacon image.

12. The cleaning robot as claimed in claim 9, further comprising an illumination light source configured to emit light toward the multiple positioning beacons.

13. The cleaning robot as claimed in claim 9, further comprising a transmitter configured to transmit the control signal.

14. The cleaning robot as claimed in claim 9, wherein the predetermined position comprises a predetermined distance and a predetermined angle, and the processor is configured to
control the cleaning robot to move to the predetermined distance from the multiple positioning beacons at first, and then control the cleaning robot to continuously move, at the predetermined distance, to the predetermined angle with respect to the multiple positioning beacons, or
control the cleaning robot to move to the predetermined angle with respect to the multiple positioning beacons at first, and then control the cleaning robot to continuously move, at the predetermined angle, to the predetermined distance from the multiple positioning beacons.

15. A recharge path determining method for a cleaning robot system, the cleaning robot system comprising a charging station that has multiple positioning beacons and a cleaning robot that has an image sensor and a processor, the multiple positioning beacons including a first positioning beacon arranged at a first surface of the charging station and a second positioning beacon arranged at a second surface, opposite to the first surface, of the charging station, the determining method comprising:
capturing, by the image sensor, light generated by the multiple positioning beacons on the charging station and generating, by the image sensor, an image frame;
calculating, by the processor, a relative position of the cleaning robot with respect to the charging station according to beacon images of the multiple positioning beacons in the image frame;
controlling, by the processor, the cleaning robot according to the relative position to return to the charging station for recharging;
identifying, by the processor, whether a number of the beacon images is smaller than a predetermined number; and
upon the number of the beacon images being smaller than the predetermined number, rotating the charging station till the number of the beacon images associated with the multiple positioning beacons arranged at different surfaces is equal to the predetermined number and then calculating the relative position by the processor,
wherein the first positioning beacon is protruded out from the first surface and the second positioning beacon is protruded out from the second surface to cause the light from both the first positioning beacon and the second positioning beacon to be acquired by the cleaning robot to form beacon images when the cleaning robot is in front of the charging station.

16. The determining method as claimed in claim 15, wherein the cleaning robot further comprises an illumination light source, and the determining method further comprises:
controlling the illumination light source to emit light corresponding to the light capturing of the image sensor.

17. The determining method as claimed in claim 15, further comprising:
distinguishing, by the processor, different positioning beacons according to different characteristics of the multiple positioning beacons.

18. The determining method as claimed in claim 15, further comprising:
transmitting, by the cleaning robot, a control signal to the charging station to rotate the charging station.

19. The determining method as claimed in claim 15, further comprising:
controlling, by the processor, a field of view of the image sensor when the image frame does not contain any beacon image.

* * * * *